(12) United States Patent
Yang

(10) Patent No.: US 10,540,533 B2
(45) Date of Patent: Jan. 21, 2020

(54) ELECTRONIC DEVICE

(71) Applicant: Shenzhen Goodix Technology Co., Ltd., Shenzhen, Guangdong (CN)

(72) Inventor: Meng-Ta Yang, Taipei (TW)

(73) Assignee: Shenzhen Goodix Technology Co., Ltd., Shenzhen, Guangdong (CN)

( * ) Notice: Subject to any disclaimer, the term of this patent is extended or adjusted under 35 U.S.C. 154(b) by 190 days.

(21) Appl. No.: 15/706,780

(22) Filed: Sep. 18, 2017

(65) Prior Publication Data

US 2018/0211090 A1 Jul. 26, 2018

Related U.S. Application Data

(63) Continuation of application No. PCT/CN2017/072525, filed on Jan. 24, 2017.

(51) Int. Cl.
| | |
|---|---|
| *G06K 9/00* | (2006.01) |
| *G06F 21/32* | (2013.01) |
| *G06F 3/044* | (2006.01) |
| *G06F 3/0488* | (2013.01) |

(52) U.S. Cl.
CPC ......... *G06K 9/00013* (2013.01); *G06F 3/044* (2013.01); *G06F 3/0488* (2013.01); *G06F 21/32* (2013.01); *G06K 9/00912* (2013.01)

(58) Field of Classification Search
CPC ............ G06K 9/00013; G06K 9/00912; G06F 1/3228; G06F 1/3265; G06F 1/3206; G06F 3/044; G06F 3/0488; G06F 3/0412; G06F 21/32; H04M 1/67; H04M 1/72577; H04M 2250/22
See application file for complete search history.

(56) References Cited

U.S. PATENT DOCUMENTS

| | | | |
|---|---|---|---|
| 2010/0220900 A1 | 9/2010 | Orsley | |
| 2013/0135247 A1 | 5/2013 | Na | |
| 2013/0222349 A1 | 8/2013 | Baek | |
| 2015/0242673 A1 | 8/2015 | Singhal | |
| 2016/0364591 A1 | 12/2016 | El-Khoury | |
| 2017/0024597 A1 | 1/2017 | Cho | |
| 2017/0220842 A1* | 8/2017 | Thompson | ......... G06K 9/00013 |
| 2018/0173926 A1* | 6/2018 | Wang | ..................... G02F 1/0105 |
| 2018/0218195 A1* | 8/2018 | Sheik-Nainar | ..... G06K 9/00013 |

(Continued)

FOREIGN PATENT DOCUMENTS

| | | |
|---|---|---|
| CN | 104598186 A | 5/2015 |
| CN | 105320924 A | 2/2016 |
| CN | 105388993 A | 3/2016 |

(Continued)

*Primary Examiner* — John B Strege

(74) *Attorney, Agent, or Firm* — Winston Hsu

(57) ABSTRACT

The present invention provides an electronic device comprising an operating circuit, wherein when the electronic device is in a sleep mode, the operating circuit is temporarily off; a display panel, comprising a light-emitting region; a plurality of fingerprint sensing pixel units, disposed within the light-emitting region; and a fingerprint recognition circuit, coupled to the plurality of fingerprint sensing pixel units; wherein when the electronic device is in the sleep mode, the display panel emits light from the light-emitting region, and the display panel does not emit light except other than the light-emitting region.

11 Claims, 2 Drawing Sheets

(56) References Cited

U.S. PATENT DOCUMENTS

2019/0019048 A1* 1/2019 Deng ................. G06K 9/00912

FOREIGN PATENT DOCUMENTS

| CN | 105867676 A | 8/2016 |
|----|---|---|
| CN | 106020418 A | 10/2016 |
| EP | 3 046 042 A1 | 7/2016 |
| KR | 10-2013-0057637 A | 6/2013 |
| KR | 10-2015-0073539 A | 7/2015 |
| KR | 10-2016-0096390 A | 8/2016 |
| WO | 2016/206207 A1 | 12/2016 |

* cited by examiner

ELECTRONIC DEVICE

CROSS REFERENCE TO RELATED APPLICATIONS

The present application is a continuation of international application No. PCT/CN2017/072525, filed on Jan. 24, 2017, of which are incorporated herein by reference in its entirety.

FIELD OF THE INVENTION

The present invention relates to an electronic device, and more particularly, to an electronic device capable of guiding a user where to press his/her finger in a sleep mode.

BACKGROUND

With the development of technology, mobile phones, digital cameras, tablet PCs, notebook computers and other portable electronic devices become more and more popular. The portable electronic devices are intended for personal use, with certain privacy. The information stored in the portable device such as phonebook, photos, personal information, etc., are privately owned. If the electronic device is lost, these data may be accessed by other people, causing unnecessary loss. Even though there are several ways using password to protect the electronic device from being used by the other people, the password may be easily to be spread or cracked, which lowers the security. Moreover, the user needs to remember the password so as to use electronic devices. If the user forgets the password, troubles would be brought to the user. Hence, personal fingerprint identification is utilized to achieve the purpose of personal identification, for enhancing the data security.

For example, the electronic device (e.g., a smart phone or a tablet computer) may verify the identity by fingerprint recognition. After the identity verification is accomplished, the electronic device may enter into a normal operation from a sleep mode. In general, when the electronic device is in the sleep mode, the display panel of the electronic device may be locked or temporarily shut down (off). However, when the electronic device is in the sleep mode, if the user likes to press his/her finger on the display panel (to input his/her fingerprint) to perform identity verification, the display panel is all dark since it is temporarily shut down, and the user do not know where to press the finger to input the fingerprint, which lowers the user convenience.

SUMMARY

It is therefore a primary objective of the present invention to provide an electronic device capable of guiding a user where to press his/her finger in a sleep mode, to improve over disadvantages of the prior art.

The present invention provides an electronic device comprising an operating circuit, wherein when the electronic device is in a sleep mode, the operating circuit is temporarily off; a display panel, comprising a light-emitting region; a plurality of fingerprint sensing pixel units, disposed within the light-emitting region; and a fingerprint recognition circuit, coupled to the plurality of fingerprint sensing pixel units; wherein when the electronic device is in the sleep mode, the display panel emits light from the light-emitting region, and the display panel does not emit light other than the light-emitting region.

Preferably, the display panel comprises a plurality of displaying pixel components, and the plurality of first displaying pixel components of the plurality of displaying pixel components is disposed inside the light-emitting region.

Preferably, when the electronic device is in the sleep mode, the plurality of first displaying pixel components inside the light-emitting region emit light, and the rest of the displaying pixel components do not emit light.

Preferably, the electronic device further comprises a first power supply circuit, coupled to the plurality of first displaying pixel components, the plurality of fingerprint sensing pixel units and the fingerprint recognition circuit; wherein when the electronic device is in the sleep mode, the first power supply circuit provides electrical power for the plurality of first displaying pixel components, the plurality of fingerprint sensing pixel units and the fingerprint recognition circuit.

Preferably, the display panel comprises a touch detecting module configured to determine a touch event on the display panel, and the touch detecting module is temporarily off when the electronic device is in the sleep mode.

Preferably, when the electronic device is in the sleep mode, the plurality of fingerprint sensing pixel units within the light-emitting region receive a press from a finger, and the fingerprint recognition circuit reads a fingerprint of the finger and generate a fingerprint recognition result corresponding to the finger.

Preferably, the electronic device further comprises a determining circuit, coupled to the fingerprint recognition circuit and the operating circuit, configured to determine whether the fingerprint recognition result matches a first fingerprint; wherein when the fingerprint recognition result matches a first fingerprint, the determining circuit generates a control signal to activate the operating circuit such that the electronic device enters into a normal operation mode.

These and other objectives of the present invention will no doubt become obvious to those of ordinary skill in the art after reading the following detailed description of the preferred embodiment that is illustrated in the various figures and drawings.

DETAILED DESCRIPTION

In order to make the objects, technical solutions and advantages of the present invention become more apparent, the following relies on the accompanying drawings and embodiments to describe the present invention in further detail. It should be understood that the specific embodiments described herein are only for explaining the present invention and are not intended to limit the present invention.

Figure 1:
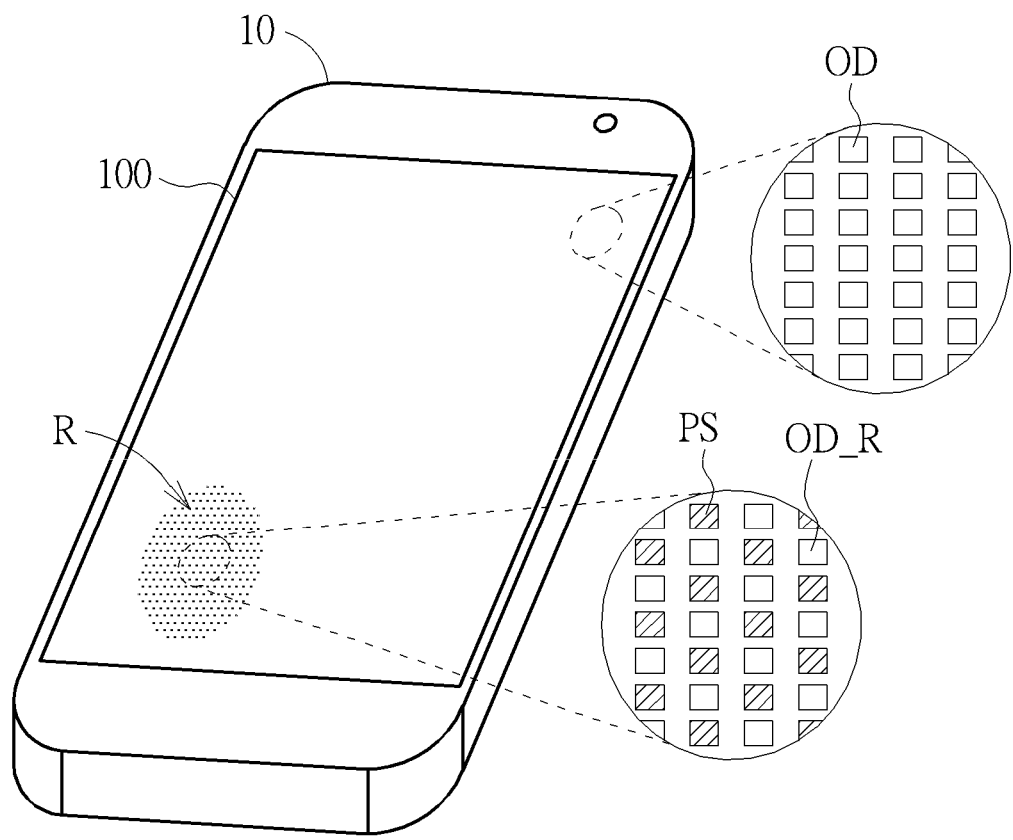
FIG. 1 illustrates an appearance of an electronic device according to an embodiment of the present invention.
Figure 2:
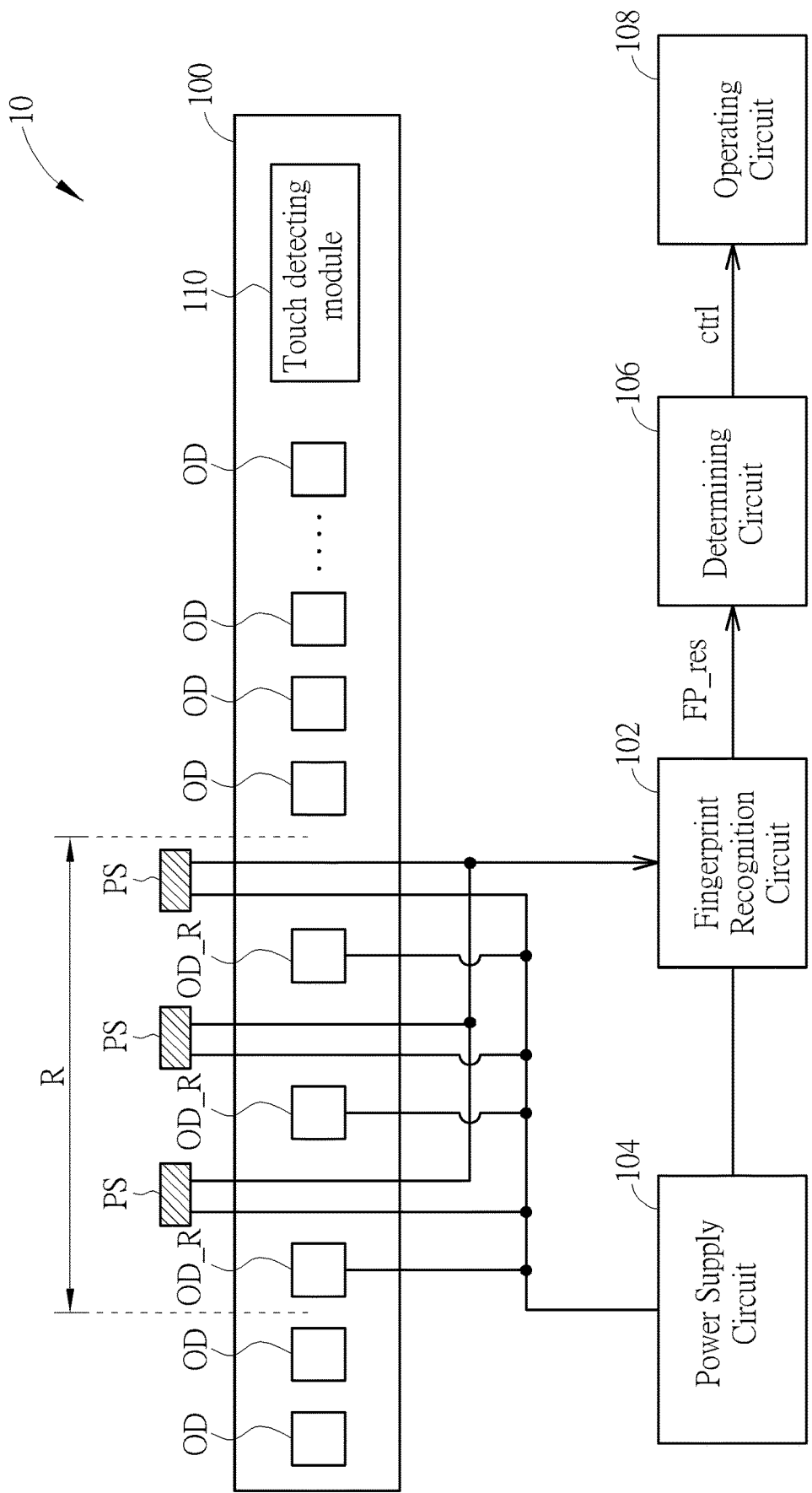
FIG. 2 is a functional block diagram of the electronic device of FIG. 1.

Please refer to FIG. 1 and FIG. 2. FIG. 1 and FIG. 2 are an appearance diagram and a functional block diagram of an electronic device 10, respectively. The electronic device 10, which may be a smart phone or a tablet computer, comprises a display panel 100, a fingerprint recognition circuit 102, a plurality of fingerprint sensing pixel units PS, a power supply circuit 104, a determining circuit 106 and an operating circuit 108. The display panel 100 is configured to display information. The plurality of fingerprint sensing pixel units PS may be disposed on the display panel 100, configured to receive a press from a finger. The fingerprint recognition circuit 102, coupled to the fingerprint sensing pixel units PS, is configured to read a fingerprint of a finger. The operating circuit 108 may comprise a processor, a memory and other functional module(s), which are configured to execute a normal operation of the electronic device 10.

In addition, the display panel 100 has a light-emitting region R. The plurality of fingerprint sensing pixel units PS is concentratively disposed within the light-emitting region R of the display panel 100. When the electronic device 10 is in a sleep mode (or a hibernate mode), the operating circuit 108 would be temporarily off (shut down), and the operating circuit 108 would not execute any operation of the electronic device 10. In addition, in the sleep mode, the display panel 100 emits light only from the light-emitting region R, and the display panel 100 is off (or does not emit light) except the light-emitting region R. In other words, when the electronic device 10 is in the sleep mode, the display panel 100 is almost dark, except the light-emitting region R which emits light. Therefore, the light-emitting region R may guide the user to press his/her finger on the light-emitting region R of the display panel 100, and the fingerprint sensing pixel units PS concentratively disposed in the light-emitting region R along with the fingerprint recognition circuit 102 may read the fingerprint of the finger, and generate a fingerprint recognition result FP_res. Furthermore, the determining circuit 106, coupled to the fingerprint recognition circuit 102 and the operating circuit 108, may determine whether the fingerprint recognition result FP_res matches a fingerprint FP_1 previously stored in the determining circuit 106. When the determining circuit 106 determines that the fingerprint recognition result FP_res matches the fingerprint FP_1, the determining circuit 106 would generate a control signal ctrl to activate the operating circuit 108/wake the operating circuit 108 up, such that the electronic device 10 would enter into a normal operation mode.

Specifically, the display panel 100 may comprise a plurality of displaying pixel components OD and OD_R. The plurality of displaying pixel components OD and OD_R may be organic light-emitting diodes (OLEDs). The displaying pixel components OD_R represent the displaying pixel components disposed within the light-emitting region R, and the displaying pixel components OD represent the displaying pixel components outside the light-emitting region R (i.e., the displaying pixel components which are not inside the light-emitting region R). When the electronic device 10 is in the sleep mode, the displaying pixel components OD_R emit light but the displaying pixel components OD do not emit light. Therefore, in the sleep mode, the light-emitting region R of the display panel 100 is bright, and the region of the display panel 100 other than the light-emitting region R is dark. In addition, the power supply circuit 104 of the electronic device 10 may be coupled to the displaying pixel components OD_R, the fingerprint sensing pixel units PS, the fingerprint recognition circuit 102 and the determining circuit 106, so as to provide electrical power for the displaying pixel components OD_R, the fingerprint sensing pixel units PS, the fingerprint recognition circuit 102 and the determining circuit 106 in the sleep mode.

In an embodiment, the power supply circuit 104, in the normal operation mode, may provide electrical power for the displaying pixel components OD, OD_R of the display panel 100 and the operating circuit 108. When the electronic device 10 switches to the sleep mode, the power supply circuit 104 may be suspended from providing power for the displaying pixel components OD and the operating circuit 108, and only provide electrical power for the displaying pixel components OD_R, the fingerprint sensing pixel units PS, the fingerprint recognition circuit 102 and the determining circuit 106. In another embodiment, the electronic device 10 may further comprise a second power supply circuit (not illustrated in FIG. 1 and FIG. 2). In the normal operation mode, the second power supply circuit may provide electrical power for the displaying pixel components OD of the display panel 100 and the operating circuit 108, and the power supply circuit 104 may provide electrical power for the displaying pixel components OD_R, the fingerprint sensing pixel units PS, the fingerprint recognition circuit 102 and the determining circuit 106. When the electronic device 10 switches to the sleep mode, the second power supply circuit may be suspended from providing power for the displaying pixel components OD and the operating circuit 108, and the power supply circuit 104 may continuously provide electrical power for the displaying pixel components OD_R, the fingerprint sensing pixel units PS, the fingerprint recognition circuit 102 and the determining circuit 106 in the sleep mode.

In addition, the display panel 100 may be a touch controlled panel. In other words, the display panel 100 may further comprise a touch detecting module 110. The touch detecting module 110 may determine a touch event applied by the user on the display panel 100 in the normal operation mode, determine a coordinate on the display panel 100 at which the touch event locates, and trigger the operating circuit 108 to perform normal operation of the electronic device 10. In the sleep mode, the electronic device 10 may temporarily turn the touch detecting module 110 off. That is, the touch event applied by the user on the display panel 100 would not trigger any operation of the operating circuit 108, which means that the electronic device 10 enters a screen locked mode at this moment. Whether it is in the sleep mode or the screen locked mode, the display panel 100 only emit light from the light-emitting region R, and do not emit light from the rest area.

In the prior art, when the electronic device enters the sleep mode, the display panel thereof is all dark since it is temporarily shut down. When the user likes to perform identity verification through pressing his/her finger or inputting his/her fingerprint) to wake up/activate the electronic device, the user do not know where to press the finger or to input the fingerprint since the display panel is all dark. In comparison, the present invention utilizes the light-emitting region of the display panel to continuously emit light even in the sleep mode, so as to guide the user to press his/her finger on the light-emitting region of the display panel; and utilizes the fingerprint sensing pixel units and the fingerprint recognition circuit disposed within the light-emitting region to read the fingerprint of the user, to wake up/activate the electronic device to enter into the normal operation mode. Therefore, the electronic device of the present invention has better user convenience.

Notably, the embodiments stated in the above are utilized for illustrating the concept of the present invention. Those skilled in the art may make modifications and alterations accordingly, and not limited herein. For example, the display panel is not limited to be the display panel comprising the displaying pixel components or light-emitting components like OLEDs, the display panel may also be a liquid-crystal display (LCD) or a plasma display panel. As long as the display panel emits light from the light-emitting region continuously when the electronic device is in the sleep mode, the requirements of the present invention is satisfied. In addition, the light-emitting region is not limited to be any specific shape, and the shape thereof can be a circle, an oval (or ellipse), a rectangular, a polygon, or any other regular or irregular shape. As long as the display panel emits light from the light-emitting region continuously when the electronic device is in the sleep mode and the fingerprint sensing pixel units along with the fingerprint recognition circuit can read the fingerprint of the user, the requirements of the present invention is satisfied. In addition, the fingerprint sensing pixel units and the displaying pixel components in the light-emitting region are not limited to be arranged interlacedly. As long as the fingerprint sensing pixel units and the displaying pixel components are all disposed within the light-emitting region, the requirements of the present invention is satisfied. In addition, the fingerprint sensing pixel units PS may be capacitive fingerprint sensing pixel units or optical fingerprint sensing pixel units, which is not limited therein.

In summary, the present invention utilizes the light-emitting region of the display panel to continuously emit light in the sleep mode, to guide the user to press his/her finger on the light-emitting region of the display panel to perform fingerprint recognition. Therefore, the electronic device of the present invention may enhance user convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device, characterized by comprising:
   an operating circuit, wherein when the electronic device is in a sleep mode, the operating circuit is temporarily off;
   a display panel, comprising a plurality of first displaying pixel components arranged within a light-emitting region, and a plurality of second displaying pixel components arranged out of the light emitting region;
   a plurality of fingerprint sensing pixel units, wherein the plurality of fingerprint sensing pixel units and the plurality of first displaying pixel components are alternately disposed within the light-emitting region without overlapping with each other, so that a density of the first displaying pixel components in the light-emitting region is less than that of the second displaying pixel components out of the light-emitting region; and
   a fingerprint recognition circuit, coupled to the plurality of fingerprint sensing pixel units;
   wherein when the electronic device is in the sleep mode, the first displaying pixel components in the light-emitting region is provided with power to emit light, so as to guide a user to press a finger on the light-emitting region of the display panel for fingerprint recognition.

2. The electronic device of claim 1, characterized in that, when the electronic device is in the sleep mode, the second displaying pixel components out of the light-emitting region do not emit light.

3. The electronic device of claim 1, characterized by further comprising:
   a first power supply circuit, coupled to the plurality of first displaying pixel components, the plurality of fingerprint sensing pixel units and the fingerprint recognition circuit;
   wherein when the electronic device is in the sleep mode, the first power supply circuit provides electrical power for the plurality of first displaying pixel components, the plurality of fingerprint sensing pixel units and the fingerprint recognition circuit.

4. The electronic device of claim 1, characterized in that, the displaying pixel components are organic light-emitting diodes (OLEDs).

5. The electronic device of claim 1, characterized in that, the display panel comprises a touch detecting module configured to determine a touch event on the display panel, and the touch detecting module is temporarily off when the electronic device is in the sleep mode.

6. The electronic device of claim 1, characterized in that, when the electronic device is in the sleep mode, the plurality of first fingerprint sensing pixel units within the light-emitting region receive a press from a finger, and the fingerprint recognition circuit reads a fingerprint of the finger and generate a fingerprint recognition result corresponding to the finger.

7. The electronic device of claim 6, characterized by further comprising:
   a determining circuit, coupled to the fingerprint recognition circuit and the operating circuit, configured to determine whether the fingerprint recognition result matches a first fingerprint;
   wherein when the fingerprint recognition result matches a first fingerprint, the determining circuit generates a control signal to activate the operating circuit such that the electronic device enters into a normal operation mode.

8. The electronic device of claim 1, characterized in that, the display panel is a liquid-crystal display (LCD).

9. The electronic device of claim 1, characterized in that, the display panel is a plasma display panel.

10. The electronic device of claim 7, further comprising a first power supply circuit and a second power supply circuit;
    wherein when the electronic device operates in a normal operation mode, the second power supply circuit provides electrical power for the second displaying pixel components out of the light-emitting region and the operating circuit; the first power supply circuit provides electrical power for the first displaying pixel components and the fingerprint sensing pixel units in the light-emitting region, the fingerprint recognition circuit and the determining circuit;
    wherein when the electronic device switches to the sleep mode, the second power supply circuit is suspended from providing power for the displaying pixel components out of the light-emitting region and the operating circuit; the first power supply circuit continues to provide the electrical power for the displaying pixel components and the fingerprint sensing pixel units in the light-emitting region, the fingerprint recognition circuit and the determining circuit in the sleep mode.

11. The electronic device of claim 5, wherein when the electronic device enters a screen locked mode, the touch event applied by the user on the display panel does not trigger any operation of the operating circuit; and wherein the first displaying pixel components in the light-emitting region is controlled to emit light in the screen locked mode while the second display pixel components out of the light-emitting region do not emit light in the screen locked mode.

* * * * *